United States Patent [19]

Naaktgeboren et al.

[11] Patent Number: 4,862,684
[45] Date of Patent: Sep. 5, 1989

[54] VARIABLE FEEDER DUCT FOR BALERS

[75] Inventors: Adrianus Naaktgeboren, Zedelgem; Roger H. Van Eecke, Blankenberge, both of Belgium; Robert R. Todd, Leola; Bryant F. Webb, Ephrate, both of Pa.

[73] Assignee: Ford New Holland, Inc., New Holland, Pa.

[21] Appl. No.: 146,444

[22] Filed: Jan. 21, 1988

[51] Int. Cl.[4] ............................................. A01D 39/00
[52] U.S. Cl. ...................................... 56/341; 56/10.2; 100/189
[58] Field of Search ................................. 56/341, 10.2; 100/189 X, 188 R, 179, 190, 191, 192

[56] References Cited

U.S. PATENT DOCUMENTS

| 2,381,620 | 8/1945 | Russell | 100/189 |
|---|---|---|---|
| 2,552,888 | 5/1951 | Druetta | 100/25 |
| 3,022,622 | 2/1962 | Nolt | 56/341 |
| 4,275,550 | 6/1981 | Swenson et al. | 56/341 |
| 4,525,991 | 7/1985 | Naaktgeboren | 56/341 |
| 4,569,282 | 2/1986 | Galant | 56/341 |

FOREIGN PATENT DOCUMENTS

| 0074533 | 3/1983 | European Pat. Off. | |
| 0120780 | 3/1984 | European Pat. Off. | |
| 1507371 | 1/1970 | Fed. Rep. of Germany . | |
| 1782821 | 10/1973 | Fed. Rep. of Germany . | |
| 2556168 | 6/1977 | Fed. Rep. of Germany | 100/188 |
| 2847381 | 5/1979 | Fed. Rep. of Germany | 56/341 |
| 1244302 | 8/1971 | United Kingdom . | |

Primary Examiner—John Weiss
Attorney, Agent, or Firm—Darrell F. Marquette; Frank A. Seemar; Larry W. Miller

[57] ABSTRACT

An agricultural baler comprises a bale case having an inlet opening in one side wall thereof; a plunger mounted for reciprocation within the bale case and back-and-forth across the inlet opening; a feeder duct communicating at one end with the inlet opening in the bale case and curving forwardly therefrom; the feeder duct comprising a pair of curved opposed wall means of which is movable relative to the other; and feeder means cooperable with the feeder duct to accumulate a charge of crop material therein and then stuff that charge into the bale case. The movable wall means is movable relative to the other wall means along substantially its entire length such that one cross sectional dimension of the feeder duct is variable along substantially the entire length of said feeder duct to ensure that, in use and as a charge of crop material is being accumulated in the feeder duct, said opposed wall means generally maintain contact with said crop material.

19 Claims, 6 Drawing Sheets

VARIABLE FEEDER DUCT FOR BALERS

BACKGROUND OF THE INVENTION

This invention relates generally to agricultural balers and more specifically to balers of the traditional rectangular type, i.e. balers which produce bales of crop material which are rectangular in shape. In particular, the invention is concerned with the feeder mechanism of such balers.

In A. Naaktgeboren U.S. Pat. No. 4,525,991, there is disclosed a baler of basically conventional design in that it comprises a bale case or chamber in which a bale of crop material is formed, and which has an inlet opening communicating with a feeder duct or chamber in which charges of crop material are accumulated. After a charge of crop material is accumulated in the feeder duct, it is transferred or stuffed in the bale case for compression by a reciprocable plunger operating therein. In this particular baler, the packing of crop material into the feeder duct to form a charge is effected by packer tines extending along a tine bar rotatable within the feeder duct, and the stuffing of an accumulated charge into the bale case is accomplished by stuffer tines mounted on the tine bar and offset from the packer tines; the outer ends of the respective sets of tines following different paths which are preferably generally apple shaped.

This feeding and stuffing arrangement has been found generally satisfactory except that, with certain crops and crop conditions, the bale case is not always filled evenly across its entire cross section by each charge of crop material from the feeder duct so that bales of uneven density are formed. This is unacceptable to the extent that the uneven density adversely affects the bale shape. Bales of irregular shape and density further also are not well suited for further handling and stacking.

The reason for this incomplete or irregular filling of the bale case cross section with charges of crop material in certain crops and crop conditions can be explained as follows. Considering first the operation of the baler in "normal" crops and crop conditions, it is noted that, as the packer tines of the feeder mechanism pack crop material in the feeder duct to accumulate a charge, this crop material is somewhat compressed during each packing stroke while being advanced in the feeder duct. As soon as the packer tines release the crop material in the feeder duct, said material tends to recover from the compression, i.e. to expand, whereby it engages opposite walls of the feeder duct and thereby remains in the advanced position therein, i.e. it does not tend to fall back towards the inlet of the feeder duct. When finally a full charge is accumulated in the feeder duct, it fills substantially the full length thereof and when subsequently this charge of crop material is stuffed into the bale case it also fills the entire cross section thereof generally evenly as is desired.

Crop material which does not have these springy characteristics behaves itself in a totally different manner during the packing and stuffing cycles of the feeder mechanism. Silage and other crops with a high moisture content do not have this natural resilience. When such crops are being handled, the crop material, which to some extent is compressed by the packer tines as it is fed thereby into the feeder duct, tends not to recover from this compression, whereby it does not maintain its position in the feeder duct when the packer tines retract. Consequently, there is a tendency for a given charge to fall back under gravity once presented to the feeder duct by the packer tines. The greater the time lag between successive tines entering the feeder duct, the further a charge is likely to fall. This problem is aggravated in larger balers which are becoming increasingly popular. This problem also is more critical in so-called "bottom-fed" or "in-line" balers than in the older "side-fed" or "offset" balers for reasons as will be readily appreciated.

When operating in "low volume" crops, the baler according to U.S. Pat. No. 4,525,991 equally may suffer from similar problems as explained hereabove and whereby bales of irregular shape may be formed.

Swenson et al. U.S. Pat. No. 4,275,550 also discloses a baler which generally is of the same type as the baler disclosed in U.S. Pat. No. 4,525,991 to which has been referred hereabove. This baler equally has a feeder duct which communicates with a bale case inlet opening from which it curves downwardly and forwardly to terminate in a forwardly facing open crop receiving mouth. The feeder means equally comprise packer means and stuffer tines. The outermost curved wall (as seen with respect to the radius of curvature of the feeder duct) is resiliently mounted adjacent its lower end to permit outward pivotal movement thereof around a point adjacent the bale case inlet opening when the density of a pre-compressed charge of crop material in the feeder duct exceeds a pre-set value and further crop material still has to be added to this charge before it can be stuffed into the bale case. This arrangement thus enables the accumulation of "larger-than-normal" charges of crop material into the feeder duct without these charges being excessively pre-compressed. However, this arrangement still fails to provide any solution for the above described problems encountered when handling silage or other crop material with a high moisture content.

It is therefore an object of the present invention to overcome or at least attenuate these problems.

SUMMARY OF THE INVENTION

According to the present invention, there is provided a baler comprising a bale case extending generally fore-and-aft with respect to the intended direction of movement of the baler and having an inlet opening in one side wall thereof, a plunger mounted for reciprocation within the bale case and back-and-forth across the inlet opening for compressing successive charges of crop material fed therein to form a bale, a feeder duct communicating at one end with the inlet opening in the bale case and curving forwardly therefrom and terminating in a forwardly facing open crop receiving mouth, the feeder duct comprising a pair of curved opposed wall means, at least one of which is movable relative to the other, and feeder means cooperable with the feeder duct to pack crop material into the feeder duct to accumulate a charge of said crop material therein and then stuff that charge into the bale case.

The one movable wall means of the feeder duct is movable relative to the other wall means along substantially its entire length such that one cross sectional dimension of the feeder duct is variable along substantially the length of said feeder duct from the crop receiving mouth thereof to the inlet opening into the bale case to ensure that, in use and as a charge of crop material is being accumulated in the feeder duct, said opposed wall means generally maintain contact with said crop material.

The foregoing combination is particularly useful when the inlet opening in the bale case is formed in the lower wall of said bale case and the feeder duct curves downwardly and forwardly from said opening and terminates in a lower open crop receiving mouth positioned generally beneath the level of the bale case.

Preferably the opposed curved wall means diverge relative to each other as seen in the direction from an intermediate point along the length of said feeder duct to the inlet opening in the bale case and irrespective of the relative position of said wall means. Furthermore said wall means preferably also converge relative to each other as seen in the direction from the crop receiving mouth to said intermediate point along the length of the feeder duct, again irrespective of the relative positions of said wall means.

In a preferred embodiment and when considered with respect to the radius of curvature of the feeder duct, the innermost wall means of the pair of opposed curved wall means of said feeder duct is movable relative to the outermost wall means which itself is fixed. Said innermost wall means may comprise two pivotally interconnected portions whereby one portion can pivot with respect to the other portion during adjustment of movable wall means relative to the fixed wall means. Alternatively the innermost wall means also may comprise two portions which are connected to each other and of which one is made of resilient material whereby the shape of the resilient portion can vary during adjustment movement of the movable wall means relative to the fixed wall means. In both foregoing arrangements a first portion of said movable wall means extends substantially in a generally fore-and-aft direction from the connection thereof to the second portion which itself extends generally in an upward direction from said connection; said generally fore-and-aft and upwardly extending wall portions defining in part, at their ends opposite to the connection therebetween, respectively the crop receiving mouth and the bale case inlet opening.

The end of the second wall portion opposite to the connection thereof with the first wall portion preferably is coupled to a wall portion of the bale case; said coupling between a bale case wall portion and the feeder duct second wall portion defining in part the bale case inlet opening and being movable generally in the fore-and-aft direction of the bale case to ensure that, in use and as said cross sectional dimension of the feeder duct is varied, said bale case inlet opening is varied accordingly.

Adjustment means may be provided which interconnect the respective ends of both wall portions opposite to the common connection therebetween and which comprise a carriage coupled to the movable bale case wall portion and which itself is movable rectilinearly in the general fore-and-aft direction of the bale case; and linkage means coupling the carriage to the end of the feeder duct first wall portion opposite to the connection thereof to the feeder duct second wall portion to ensure that any movement of the carriage in the generally fore-and-aft direction of the bale case is translated into a movement of said end of the feeder duct first wall portion in the generally upright direction and vice versa; the arrangement being such that the dimensions of both the bale case opening and the mouth are increased, and respectively decreased simultaneously.

DESCRIPTION OF THE DRAWINGS

An agricultural baler in accordance with the present invention will now be described in greater detail, by way of example, with reference to the accompanying drawings in which.

DESCRIPTION OF THE PREFERRED EMBODIMENT

Figure 1:
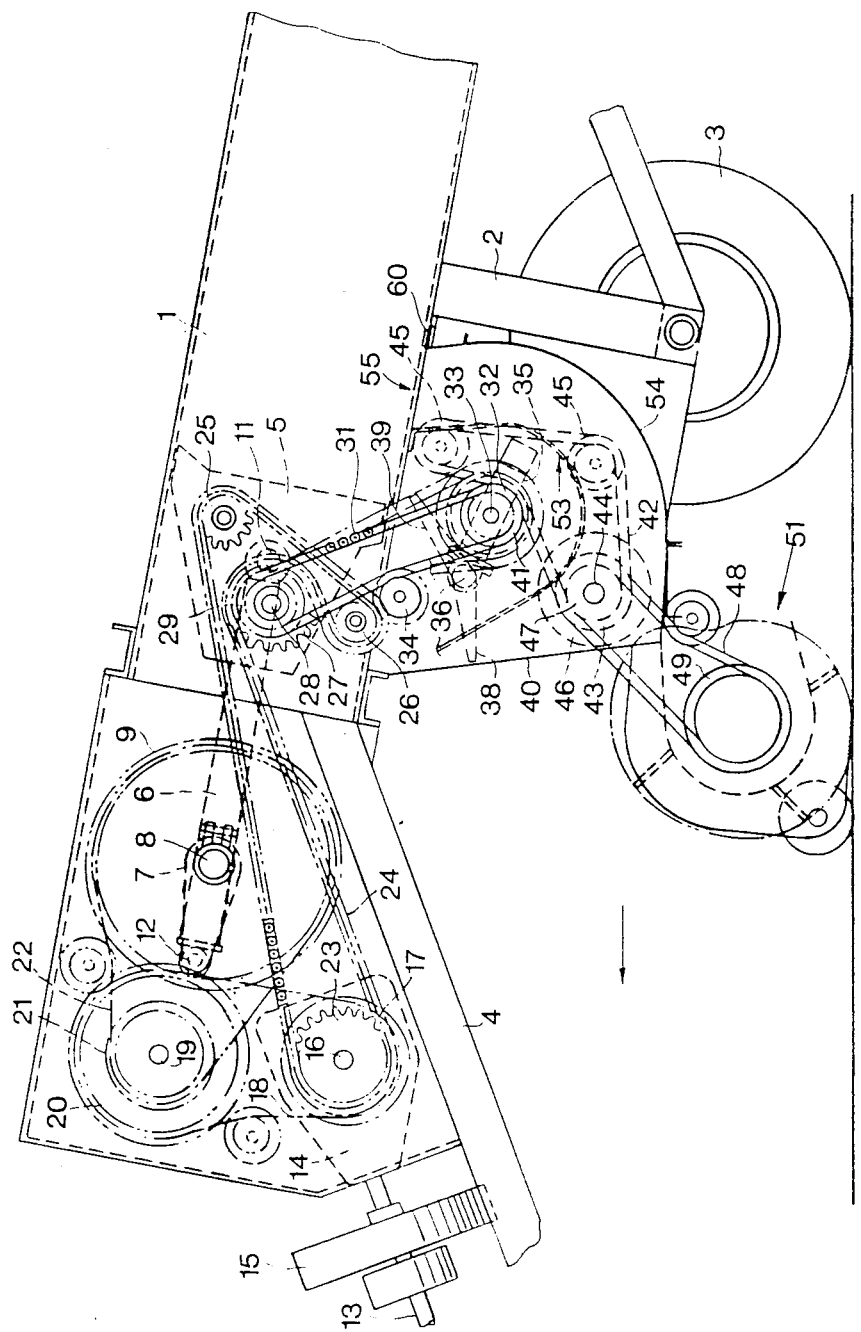
FIG. 1 is a side view of the baler.

In the following description, right hand and left hand references are determined by standing at the rear of the machine and facing in a direction of forward travel. Also, in the following description, it is to be understood that such terms as "forward", "rearward", "left", "right", "upwardly", etc. are words of convenience and are not to be construed as limiting terms.

Referring to FIGS. 1 to 4 of the drawings, the baler comprises a bale case or chamber 1 mounted on a frame 2 which is supported by wheels 3. A tongue or draw bar 4 extends forwardly from the bale case 1 for attachment to a tractor or other vehicle used for towing the baler, this vehicle not being shown. A plunger 5 is mounted for reciprocation within the bale case 1 and is attached by a connecting rod 6 to a crank arm 7 attached to a shaft 8 which carries a sprocket 9. The connecting rod 6 is pivotally attached to the plunger at 11 and pivotally attached at its other end to the crank arm 7 at 12. A drive shaft 13 is adapted for connection to the power take-off (PTO) of the tractor or other vehicle and is also connected to a gear box 14 on the baler via a flywheel 15. The gear box 14 has an output shaft 16 which carries a sprocket 17 around which a chain 18 passes to a sprocket 20 of larger diameter on a shaft 19, this shaft also carrying a smaller diameter sprocket 21 coupled by a chain 22 to the sprocket 9 on the shaft 8. This conventional arrangement effects a speed reduction for the rotation of the sprocket 9 from the gear box 14, rotation of the sprocket 9 serving to reciprocate the plunger 5 within the bale case 1 by virtue of the crank 7.

Figure 2:
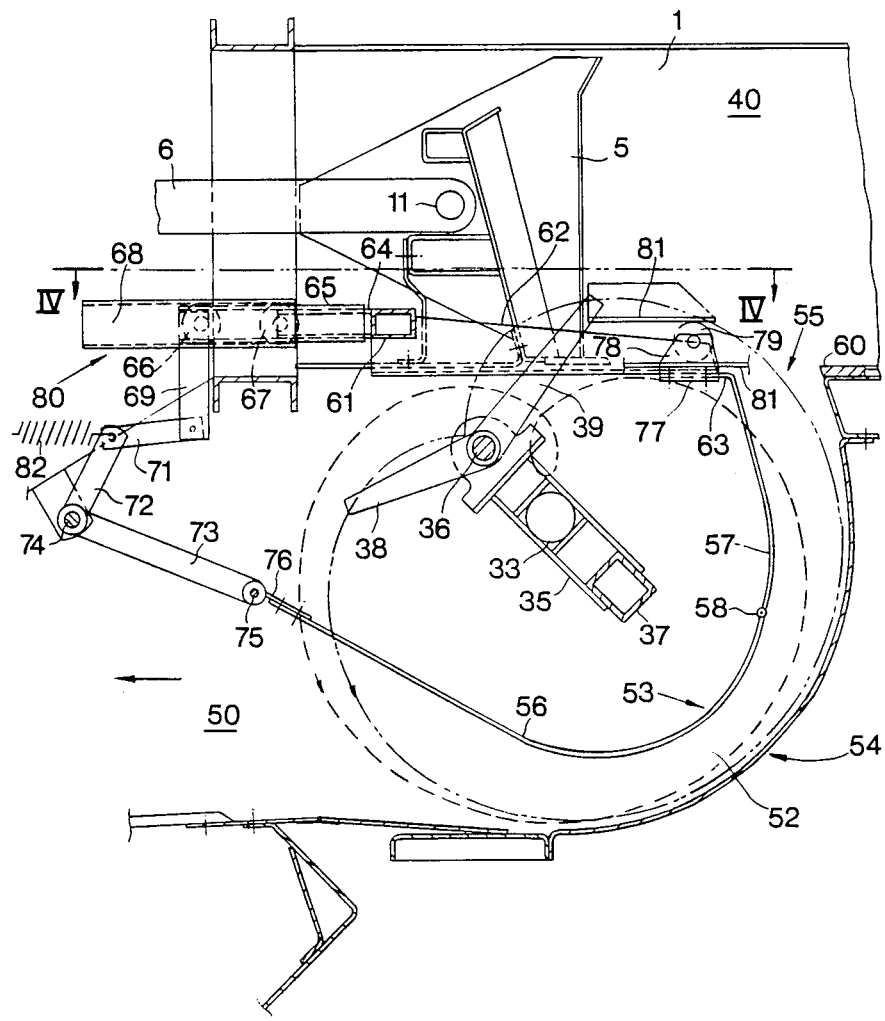
FIG. 2 is partial sectional of a detail of FIG. 1 on a larger scale.
Figure 3:
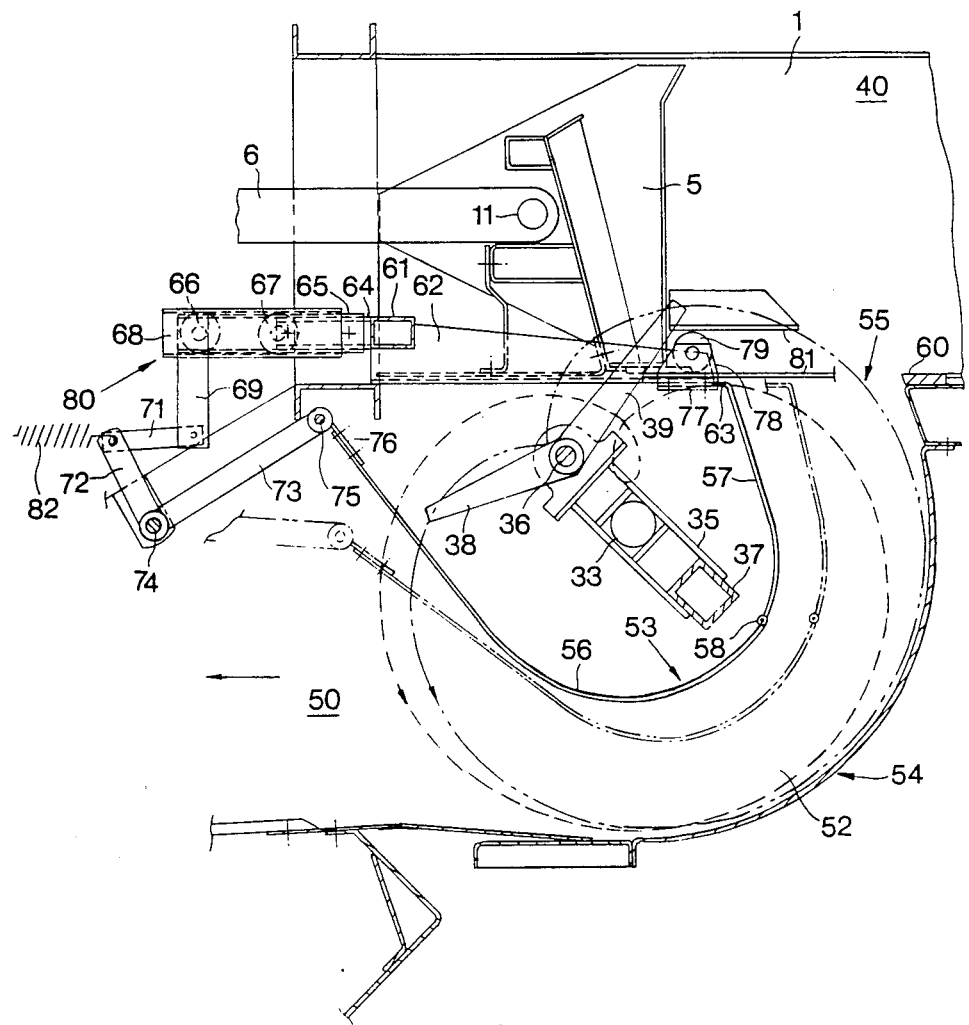
FIG. 3 is a view similar to that of FIG. 2 but showing certain components in different operative positions.

The output shaft 16 of the gear box 14 also carries a sprocket 23 around which passes a chain 24 which extends around idler sprockets 25 and 26 and a drive sprocket 27 carried by a shaft 28. The shaft 28 carries a further sprocket 29 around which passes a chain 31 extending around a sprocket 32 provided on a further shaft 33. The chain 31 returns to the sprocket 29 via an idler sprocket 34. In fact, two shafts 33 are provided, one at each side of the machine, and rotatably mounted in respective side walls 40 of the baler. Arms 35 are connected at their centres to respective shafts 33 and carry at one outer end a tine bar 36; the tine bar being rotatably mounted with respect to these arms. The arms 35 are in fact the limbs of a U-shaped frame, the base portion of which is a beam 37 of square section as seen in FIGS. 2 and 3 and which is driven from the sprocket 32 on one of the shafts 33.

The tine bar 36 carries two sets of generally opposed alternating tines in the form of a first set of packer tines 38 and a second set of stuffer tines 39. The stuffer tines 39 are longer than the packer tines 38 and the arrangement and operation of these feeder means is generally similar to that disclosed in U.S. Pat. No. 4,525,991 to which reference already has been made hereabove and the disclosure of which is included herein by reference. Alternatively, the feeder means employed in the present invention equally could be generally similar to the feeder means shown and described in the co-pending U.S. application No. 021,082, filed Mar. 3, 1987, the disclosure of which is incorporated herein by reference.

Returning to FIG. 1 of the drawings, the shaft 33 carries a pulley 41 around which a belt 42 extends to drive a pulley 43 on a shaft 44, the belt 42 also extending around two idler pulleys 45. The components 41 to 45 are duplicated, one set being on either side of the machine and the shafts 44 forming part of respective stub augers 46. One of the shafts 44 carries a further pulley 47 around which a belt 48 extends to drive a further pulley 49 on a crop pick-up device 51. In operation of the machine, crop material is picked up from the ground by the pick-up device 51 which feeds it to the stub augers 46 which then consolidate the crop material centrally of the baler for transfer into the inlet opening or mouth 50 of a feeder duct of chamber 52 defined in part by opposed curved walls 53 and 54 and which terminates at an inlet opening 55 of the bale case 1. In other words, the bale case 1 is provided with an inlet opening 55 in a lower wall thereof and which communicates with a feeder duct 52 which curves downwardly and forwardly therefrom to terminate in a forwardly facing open crop receiving mouth 50. The feeder duct 52 is defined by transversely opposite, generally flat side walls and a pair of curved opposed walls 53, 54 extending between said transversely opposite walls.

Figure 4:
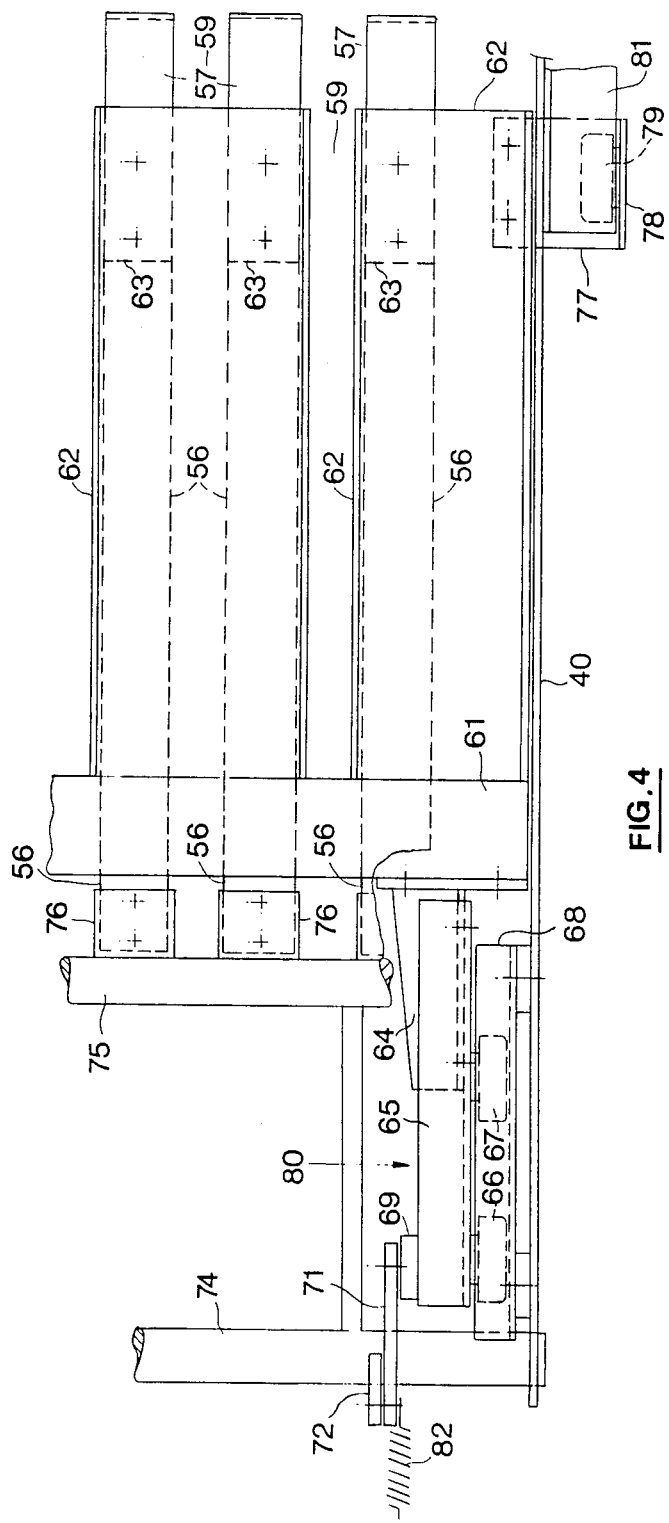
FIG. 4 is a partial sectional view of the line iv—iv of FIG. 2.

The opposed curved walls 53 and 54 of the feeder duct 52 are movable relative to each other by way of the innermost wall as seen with respect to the radius of curvature of the feeder duct 52, being movably mounted relative to the outermost wall 54 which itself preferably is fixed. The innermost wall 53 comprises two portions 56 and 57 pivotally interconnected by a pivot 58; each portion being made up of a series of curved slats (as can be seen in FIG. 4) which are spaced apart transversely of the machine and which thus provide slots 59 therebetween through which the tines 38 and 39 can extend to engage crop material and feed it into the feeder duct 52. It thus will be noted that, as seen with respect to the radius of curvature of the feeder duct, the feeder means, which basically consist of the packer tines 38 and stuffer tines 39 are movably mounted inwardly of the innermost curved wall 53, which itself is movable to-and-from the axis of rotation of said feeder means.

The upper end of the feeder duct inner wall portion 57 is attached to a transverse beam 61 by way of a plurality of U-shaped arms 62 attached at one end to the beam and at the other to turned-over ends 63 of respective pairs of slats. Inbetween adjacent pairs of U-shaped arms 62, alternate slots 59 defined by corresponding slots are extended for the passage therethrough and into the bale case 1 of the longer stuffer tines 39 and the needles (not shown) forming part of the conventional bale wrapping apparatus. The fact that the arms 62 block alternate slots 59 at the underside of the bale case 1 is immaterial because the shorter packer tines 38 which have paths aligned therewith do not enter into the bale case 1. The U-shaped arms 62 together form a wall portion of the bale case 1 which, as will be described hereafter in more details, is movable generally in a fore-and-aft direction relative to the bale case 1 so as to ensure that the fore-and-aft dimension of the bale case inlet opening 55 varies in unison with the feeder duct 52.

Attached to the respective ends of the transverse beam 61 are brackets 64 (FIG. 4) which extend forwardly of the machine and are in turn attached to U-shaped members 65 on the vertical intermediate limbs of which are provided rollers 66 and 67. The rollers 66, 67 engage respective channels 68 which are mounted on the frame 2 of the baler and which are also U-shaped; the rollers being guided between upper and/lower guides provided by the two outer limbs of the channels while that the intermediate limbs of which are generally vertical. An arm 69 is fixedly attached to, and depends from, each of the members 65 and is pivotally attached at its lower or free end to a further arm 71 which in turn is pivotally attached to an arm 72. Each arm 72 forms one half of a bell crank lever, the other half being an arm 73 and each bell crank lever being pivoted at 74 on the baler frame 2. The arm 73 of each bell crank lever is pivotally attached at its outer end to a common pivot shaft 75 which extends across the width of the baler and from which extends a plurality of lugs 76 to which are attached respective ones of the slats making up the inner wall portion 56 of the feeder duct 52.

Thus, there is provided a carriage 80 to which the upper portion 57 of the inner feeder duct wall 53 is attached, this carriage comprising the components 69, 65, 64, 61 and 62. The two extreme arms 62 carry, at their rearmost ends, respective brackets 77 which extend under the respective sidewalls 40 of the bale case 1 and have upturned flanges 78 each of which carries a further roller 79. The two rollers 79 roll along respective tracks 81 provided on the outside of the walls 40 of the bale case 1.

Looking now at FIGS. 2 and 3, it will be noted that the movable wall portion 56 and a corresponding portion of the fixed wall 54 define a generally fore-and-aft extending crop receiving portion of the feeder duct 52 terminating at its forward end in the mouth 50. In contrast therewith the movable wall portion 57 cooperates with a corresponding portion of the fixed wall 54 to define therebetween a generally upright and rearward portion of the feeder duct 52 which communicates with the bale case inlet opening 55.

In operation of the baler, crop material is fed to the feeder duct 52 from the pick-up 51 and enters the mouth 50. In normal operation, the packer tines 38 move crop material along the feeder duct 52 to the rearward and upper portion thereof. Before this material is stuffed into the bale case 1 by the stuffer tines 39 more crop material is fed into the feeder duct 52 by said stuffer tines 39, which, towards the end of their operative stroke finally stuff all material, which has accumulated in the feeder duct 62, into the bale case 1. During the packer stroke and as crop material is advanced into the generally upright and rearward portion of the feeder duct 52 it is compressed to some extent. As the packer fingers 38 retract and before the stuffer tines 39 feed further crop material into the feeder duct 52, this crop material expands again, at least when this crop material is "normal" dry hay or straw. Due to this recovering of the crop material from the compression, said crop material maintains contact at least with the opposed curved walls 53, 54 of the feeder duct 52 whereby this crop material tends to remain in its advanced position in the feeder duct 52 rather than to fall back.

Now, if the crop material has a high moisture content, be it wet straw, wet hay or indeed silage, there is no such natural resilience in the crop material whereby this crop material does not recover to any substantial degree from a compression when released. As a result, there is a tendency for such crop material to fall downwardly in the feeder duct 52 once released by the tines 38. To counteract this problem, the inner wall 53 of the feeder duct 52 is made movable towards the outer wall 54 in accordance with the invention.

There are basically two ways of adjusting the movable wall 53. One is to have an entirely automatic operation and the other is to have an adjustment in steps with an adjusted position being held until it is seen to be unsatisfactory. Essentially, the movable wall 53 needs to be positioned such that it is substantially in constant contact with the crop material delivered to the bale feeder duct 52 so as to prevent that material from falling down the feeder duct.

The preferred mode of operation is the automatic mode in which the movable wall 53 will be able to accommodate, automatically, varying sizes of charges of material introduced thereinto. For example, considering FIG. 2 in which the feeder duct 52 is shown at its minimum, and assuming that an excessively large charge is delivered to the feeder duct 52, said charge will force upwardly the front portion 56 of the movable wall 53 which in turn will rotate the bell crank lever arms 73 anticlockwise and will thus rotate the associated arms 72 in a similar direction. This movement will result in the carriage 80 being moved to the left as seen in FIGS. 2, whereupon the wall portion 57 will be moved to the left, whereby the overall width of the bale feeder duct 52 is increased. That is, the vertical width of the infeed opening or mouth 50 of the feeder duct 52 is increased by way of the wall portion 56 being pivoted upwardly about the pivot 58, and the front-to-rear width of the feeder duct portion leading to the bale case inlet 55 is increased by way of the whole of the wall portion 57 moving to the left as described. It should be noted that whatever position the movable wall 53 adopts, it always maintains a converging throat or initial infeed portion 50, and a diverging discharge portion and this is an important aspect of the present invention. Once that large charge of crop material is pushed into the upper portion of the bale feeder duct 52, where it is compressed by the packer tines 38, it may be that portion of the duct needs to be even wider and this can be effected automatically by that compressed crop material pushing on the wall portion 57 and thus moving the carriage 80 further to the left as seen in FIGS. 2 and 3. This movement will rotate the bell crank levers 72, 73 further in an anticlockwise direction and thus raise even further the portion 56 of the wall 53.

Assuming now that there is no excessively compressed material in the upper portion of the bale feeder duct 52 and that the next incoming charge is of average size, then the movable wall 53 of the duct will automatically revert to, or towards, the position in which the feeder duct is at its narrowest (FIG. 2 position). This is because the weight of the wall portion 56 is such as to rotate the bell crank levers 72, 73 in a clockwise direction and thus move the carriage 80 to the right, as seen in FIGS. 2 and 3, and hence move the wall portion 57 to the right at the same time as the portion 56 is lowered. Thus, there is always the tendency for the movable wall 53 to be positioned, unless forced otherwise by the crop material coming into the feeder duct 52, such that the duct is at its narrowest. If the weight of the movable wall portion 56 is too great for the automatic adjustment system to operate smoothly, then it may be offset partially by the provision of springs 82 which act to rotate the bell crank levers 72, 73 anticlockwise, i.e. in a direction to raise the movable wall portion 56. The tension in the springs 82 even can be arranged such that the movable wall portion 56 will remain in any position in which it is placed.

When baling dry springy crops, such as straw, at high feed rates, the movable wall 53 normally will be positioned at or close to its extreme position shown in full lines in FIG. 3 whereby the feeder duct 52 is at or near its maximum. In contrast therewith, when baling crop material with a high moisture content, such as silage, the movable wall 53 normally will be positioned at or close to its other extreme position shown in full lines in FIG. 2, even when baling at high feed rates. Thereby bales of even density are formed irrespective of the difficult conditions presented by the baling of such crops. Of course, the movable walls 53 also will assume any intermediate position dependent on the flow rate of crop material passing through the feeder duct 52. Such an intermediate position is shown in phantom in FIG. 3.

From what precedes it will be seen that the inner wall 53 of the feeder duct 52 (as seen with respect to the radius of curvature of said duct) is movable relative to the outer fixed wall 54 over its full length such that one cross sectional dimension of the feeder duct 52 is variable along the length of the feeder duct from the crop receiving mouth 50 thereof to the inlet opening 55 into the bale case 1. This is advantageous and indeed very much desirable to ensure that, whatever the position of the movable upper wall portion 57 is, the rear and upper portion of the feeder duct 52 always diverges towards the bale case inlet 55 as already explained.

Furthermore, also the bale case inlet opening 55 is adjustable in unison with the feeder duct 52 by the provision of a movable bale case wall portion 62 which is coupled to the upper end of the upper movable feeder duct wall portion 57; this coupling defining in part said inlet 55. Thereby it is avoided that the bale case inlet opening 55 would form a bottle neck for the charges of crop material when entering the bale case 1 from the feeder duct 52.

The bale case inlet opening 55 conveniently could be made adjustable because the inner curved wall 53 of the feeder duct 52 rather than the outer wall 54 thereof is made adjustable and a coupling between said inner movable wall 53 of the feeder duct 52 and a movable bale case wall portion 62 became possible without affecting any other operation of the baler. This coupling indeed in part defines the inlet opening 55 and the floating mounting thereof does not have any adverse effect on the baler operation. In contrast therewith, the opposite edge of the inlet opening 55 preferably should be fixed because a knife 60 has to be provided at this edge as is conventional to sever each wad of crop material in the bale case 1 from further crop material still in the feeder duct 52 upon each compression stroke of the plunger 5. Consequently, also the upper edge of the outer curved wall 54 of the feeder duct 52 preferably should be fixed which means that this wall could not be made adjustable along its full length which is not acceptable following the present invention.

Furthermore, it also has been found to be advantageous for the packing and stuffing operation of the feeder means 38, 39 to have the outer curved wall 54 of the feeder duct 52 at a fixed position relative to the paths of these feeder means, which implies that only the inner curved wall 53, i.e. the wall closed to the axis of the feeder means 38, 39, may be made adjustable.

It should be noted still that, even though the wall portions 56, 57 of the movable wall 53 are pivotally coupled to each other at 58, at least one wall portion; preferably the first wall portion 56; should be made of resilient material such as leaf spring type slats, so as to permit deformation thereof during adjustment movement of the inner wall 53 as otherwise this adjustment movement would be impossible. The resilient forces in this wall portion 56 resulting from said deformation may add to the gravitational forces which tend to urge the inner wall 53 back to the minimum feeder duct position.

It will be understood that changes to the details, materials, steps and arrangement of parts which have been described and illustrated to explain the nature of this invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention.

As an example, the movable wall 53 can be operated other than automatically, for example by hydraulic or electrical actuation whereby it is positioned in a selected position which is the optimum position at any given point in the baling operation. In this arrangement, adjustment is made in steps, as has already been suggested hereabove and an adjusted position normally is held until it is seen to be unsatisfactory.

It also will be appreciated that the movable wall portions 56 and 57 and the pivotal coupling 58 therebetween can be replaced by a single resilient wall formed of transversely spaced apart leaf spring type slats which are coupled at their lower and forward ends to the lugs 76 and at their upper and rearward ends to arms 62 of the movable bale case wall portion. During operation and when the cross sectional dimension of the feeder duct 52 is varied, said resilient wall is deformed to accommodate simultaneously the pivotal movement of the crank arms 73 and the fore-and-aft movement of the arms 62.

It further also will be appreciated that, while the preferred embodiment of the invention has been described hereabove in connection with a so-called "in-line" baler comprising a bottom fed bale case, the instant invention also can be applied advantageously on an offset or side fed baler having the feeder duct 52 communicating with a bale case inlet opening in a side wall thereof.

Figure 5:
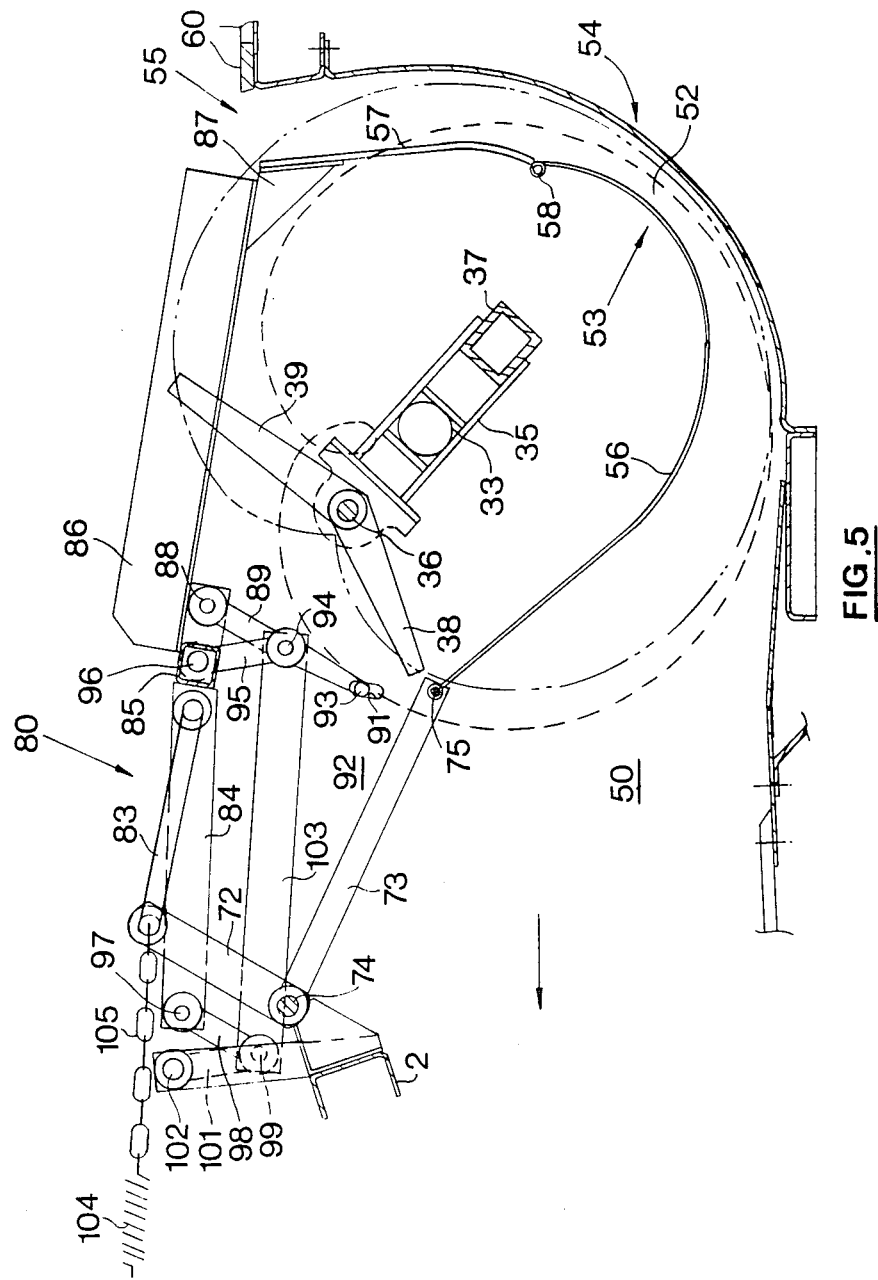
FIGS. 5 and 6 are similar to FIG. 2 and 3, respectively, but showing an alternative embodiment.
Figure 6:
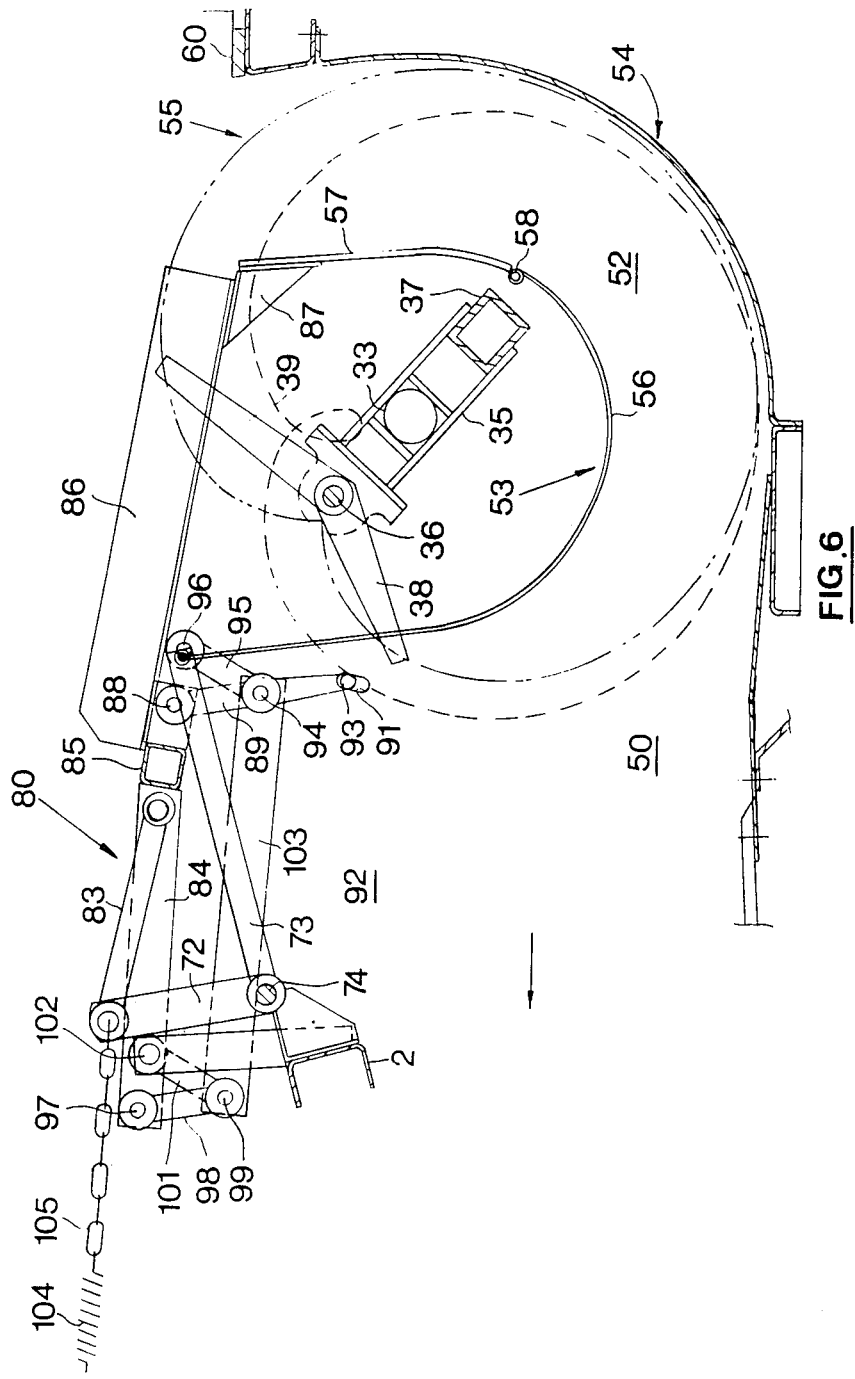

With reference to FIGS. 5 and 6, still another alternative arrangement of the invention will be described hereafter. These FIGS. 5 and 6 generally correspond to FIGS. 2 and 3 to the extent that they equally show the movable wall 53 in the position defining the narrowest bale chamber width respectively the maximum feeder duct width. In this alternative embodiment, similar components have like reference numerals and the essential difference is that the carriage 80 is no longer moved on rollers but by a series of pivotable levers as will now be described.

As with the first embodiment, there is a bell crank lever arrangement 72, 73 at each side of the bale feeder chamber. Arms 83 equivalent to the arms 71 are provided. However, these arms 83 are connected directly to the carriage 80 rather than through the intermediary of the arms 69 of the first embodiment. The carriage in this embodiment comprises transversely opposite members 84 (comparable to members 64 in the first embodiment), a transverse beam 85 of rectangular cross section (comparable to beam 61 of the first embodiment), and members 86 (comparable to the members 62 of the first embodiment) which are coupled by fillets 87 to the upper ends of corresponding slats 57 of the wall 53.

The carriage 80 is mounted at each side of the baler on a linkage arrangement as follows : The carriage 80 is pivotally attached at each side at 88 to one end of a link 89, the other end of which is both pivotable and slidable in a slot 91 provided in a corresponding wall portion 92 of the frame 2 by way of a pivot pin 93. Each link 89 is pivoted at its centre 94 to one end of a shorter link 95, the other end of which is pivotally attached at 96 to the frame 2 of the baler. The end of each carriage member 84 remote from the beam 85 is pivotally attached at 97 to one end of a link 98, the other end of which is pivotally attached at 99 to an end of a further link 101; in turn the end of this link being pivotally attached at 102 to the baler frame 2. The pivot 94 at the centre of each link 89 and the common pivot 99 of the corresponding links 98 and 101 are interconnected by a link 103.

Thus a parallelogram is provided on each transverse side of the carriage 80 and which is formed by the link 103, the portion of the carriage 80 between the pivotal attachments thereto of the links 98 and 89, the arm 98 itself, and the upper portion of the arm 89. In addition, a further parallelogram is provided again on each transverse side of the carriage 80 and with the links 95 and 101 being one opposed pair of arms thereof and with the other pair being formed by the link 103 on the one hand and the fixed distance between the two pivot points 96 and 102 on the baler frame 2 on the other hand.

Now assuming that the carriage 80 is moved to the left as seen in FIG. 5 so as to change the feeder duct 52 from the minimum width (FIG. 5) towards the maximum (FIG. 6), the parallelograms undergo movements as follows: As the carriage 80 moves to the left, the links 89 are pivoted anticlockwise about their pivots 93 in the slots 91 thus taking with them the centre pivots 94 and hence also the links 95. Actually the pivots 94 in fact move along arcs around the fixed pivot points 96 of the links 95 on the frame 2 and therefore cause the links 89 to move downwardly, which movement is accommodated by the engagement of the end pivots 93 thereof in the slots 91. At the same time, the top pivots 88 of the links 89 to the carriage 80 are rotated anticlockwise, as seen in FIG. 5, about the centre pivots 94 and thus these top pivots 88 move along arcs which effectively lift said top pivots 88 relative to the centre pivots 94. Clearly, as the pivots 94 are moved downwardly relative to the frame 2 and the pivots 88 are moved upwardly relative to the pivots 94 these two movements cancel each other whereby the pivots 88 move rectilinearly. It will be appreciated that the other links 98 and 101 of the two parallelograms move correspondingly and the details thereof need not be described here. The overall result is that the carriage 80 is moved rectilinearly and the required movement of the movable wall 53 effected. Clearly, the reverse rectilinear movement takes place when the carriage 80 is moved to the right, as seen in FIGS. 5 and 6.

In summary, the carriage 80 is movably mounted, in accordance with this alternative embodiment, on the frame of the baler by first and second parallelogram linkage arrangements having a common first link 103. The first parallelogram linkage arrangement further also comprises a portion 84 of the carriage 80 and first and second arms 89 98 pivotally connected to respectively said portion 84 of the carriage 80 and the common first link 103. The first arm 89 is extended beyond its pivotal coupling with the common first link 103 for slideably and pivotally engaging at its free end in an elongate slot 91 in a frame member 92. The second parallelogram linkage arrangement further also comprises a portion of the frame 2 of the baler and third and fourth arms 95, 101 pivotally connected to respectively said portions of the frame and the common first link 103.

While it is very well conceivable that only one such twin or double parallelogram linkage arrangement including a common first link 103, is provided for movably supporting the carriage 80 on the frame, it will be appreciated that preferably one such double parallelogram linkage arrangement is provided at each transverse side of the carriage 80.

As with the first embodiment, springs 104 can be provided in order to facilitate movement of the movable wall 53 to the widest bale feeder duct position. In this case, each spring 104 is attached at one end to a selected link of an associated chain 105 which in turn is attached to the corresponding arm 72 of the bell crank lever.

As with the first embodiment, the arrangement of FIGS. 5 and 6 can be operated automatically or adjusted to a selected movable wall position by hydraulic or electrical means, for example. Again, in this embodiment, it is a feature that the throat 50 always converges from the mouth thereof and the remainder of the duct 52 diverges to the bale case inlet opening 55 irrespective of the position of the movable wall 53 relative to the fixed wall 54.

It is also possible to use components of the baler which are, in some way, sensitive to the loading of the baler for controlling the position of the movable wall 53. For example, the windguard conventionally provided over the pick-up mechanism 51, but which is not shown in the accompanying drawings, moves generally vertically to accommodate varying thicknesses of crop material picked up by the pick-up mechanism and fed as a layer or wad to the feeder duct 52. This movement can be used to vary the position of the feeder duct movable wall 53 accordingly. Alternatively, the torque on a drive shaft or on the shaft of the windguard, which is representative of the baler loading, can be sensed and used to adjust the position of the feeder duct movable wall 53.

If desired, hay dogs can be incorporated into the feeder duct. Such hay dogs are displaced outwardly of the duct when crop material is fed thereinto, and spring back into the duct thereafter so as to help retain the crop material in position and hence prevent is from falling back down the feeder duct.

It will be seen that the present invention provides a very effective solution to the problems of the prior art balers described in the introduction of this specification.

What is claimed is:

1. An agricultural baler comprising:
   a bale case extending generally fore-and-aft with respect to the intended direction of movement of the baler and having an inlet opening in one wall thereof;
   a plunger mounted for reciprocation within the bale case and back-and-forth across the inlet opening for compressing successive charges of crop material fed therein to form a bale;
   a feeder duct communicating at one end with the inlet opening in the bale case and extending forwardly therefrom and terminating in a forwardly facing open crop receiving mouth; the feeder duct comprising a pair of opposed wall means, at least one of which is movable relative to the other;
   feeder means cooperable with the feeder duct to pack crop material into the feeder duct to accumulate a charge of said crop material therein and then stuff the charge into the bale case;
   said at least one movable wall means being movable relative to the other wall means along substantially its entire length such that one cross sectional dimension of the feeder duct is variable along substantially the length of said feeder duct from the crop receiving mouth thereof to the inlet opening into the bale case to ensure that, in use and as a charge of crop material is being accumulated in the feeder duct, said opposing wall means generally maintain contact with said crop material; and
   said movable wall means including first and second wall portions connected together, the end of the second wall portion opposite to the connection thereof with the first wall portion being coupled to a wall of the bale case; said coupling between the bale case wall add the feeder duct second wall portion defining in part the bale case inlet opening and being movable generally in the fore-and-aft direction of the bale case to ensure that, in use and as said cross sectional dimension of the feeder duct is varied, said bale case inlet opening is varied accordingly.

2. A baler according to claim 1, wherein the inlet opening in the bale case is formed in the lower wall of said bale case and the feeder duct curves downwardly and forwardly from said opening and terminates in a lower open crop receiving mouth positioned generally beneath the level of the bale case.

3. A baler according to claim 2, wherein irrespective of the relative positions of the opposed wall means of the feeder duct, said wall means diverge relative to each other as seen in the direction from an intermediate point along the length of said feeder duct to the inlet opening in the bale case.

4. A baler according to claim 3, wherein irrespective of the relative positions of the opposed wall means of the feeder duct, said wall means converge relative to each other as seen in the direction from the crop receiving mouth to said intermediate point along the length of the feeder duct.

5. A baler according to claim 4, wherein, when considered with respect to the radius of curvature of the feeder duct, the innermost wall means of the pair of opposed wall means of said feeder duct is movable relative to the outermost wall means which itself is fixed.

6. A baler according to claim 5, wherein, as seen with respect to the radius curvature of the feeder duct, the feeder means are movably mounted inwardly of the innermost wall means; said innermost wall means being formed by transversely spaced apart elongate members defining slots therebetween for the feeder means, in use, to project therethrough and into the feeder duct.

7. A baler according to claim 5, wherein the innermost wall means comprises the first and second wall portions pivotally interconnected whereby one portion can pivot with respect to the other portion during adjustment of the movable wall means relative to the fixed wall means.

8. A baler according to claim 5, wherein the innermost wall means comprises the first and second wall portions which are connected to each other and of which one is made of resilient material whereby the shape of the resilient portion can very during adjustment movement of the movable wall means relative to the fixed wall means.

9. A baler according to claim 7, wherein the first portion of said movable wall means extends substantially in a generally fore-and-aft direction from the connection thereof to the second portion which itself extends generally in an upward direction from said connection; said generally fore-and-aft and upwardly extending wall portions defining in part, at their ends opposite to the connection therebetween, respectively the crop receiving mouth and the bale case inlet opening.

10. A baler according to claim 1 wherein adjustment means interconnect the respective ends of both wall portions opposite to the common connection therebetween; the arrangement being such that, in use:
   movement of one of said opposite ends induces a corresponding movement to the other opposite end;
   the end of the first wall portion opposite to the connection thereof to the second wall portion is movable in a generally upright direction; and
   the dimension of both the bale case opening and the mouth are increased, and respectively decreased simultaneously.

11. A baler according to claim 10, wherein the adjustment means comprise:
   a carriage coupled to the movable bale case wall means and which itself is movable rectilinearly in the general fore-and-aft direction of the bale case; and
   linkage means coupling the carriage to the end of the feeder duct first wall portion opposite to the connection thereof to the feeder duct second wall portion to ensure that any movement of the carriage in the generally fore-and-aft direction of the bale case is translated into a movement of said end of the feeder duct first wall portion in the generally upright direction and vice versa.

12. A baler according to claim 11, wherein the carriage is provided with rollers engageable with tracks mounted on the bale case.

13. A baler according to claim 12, wherein the feeder duct movable wall portion also is provided with rollers engageable with tracks mounted on the bale case.

14. A baler according to claim 11, wherein the carriage is movably mounted on the frame of the baler by first and second parallelogram linkage arrangements having a common first link;
   the first parallelogram linkage arrangement further also comprising a portion of the carriage and first and second arms pivotally connected to respectively said portion of the carriage and the common first link and said first arm being extended beyond its pivotal coupling with the common first link for slideably and pivotally engaging at its free end in an elongate slot in a frame member and
   the second parallelogram linkage arrangement further also comprising a portion of the frame of the baler and third and fourth arms pivotally connected to respectively said portion of the frame and the common first link.

15. A baler according to any of the claim 14, wherein the linkage means comprises a bell crank lever which is pivotally mounted on the frame of the baler and which is pivotally coupled at one end to the end of the feeder duct first wall portion opposite to the connection thereof to the feeder duct second wall portion and pivotally coupled at the other end to the carriage.

16. A baler according to claim 15, wherein the bell crank lever is directly pivotally attached at said one end to the feeder duct first wall portion and is pivotally coupled at said other end to the carriage through the intermediary of one or more further links.

17. A baler according to claim 10, wherein the feeder duct first wall portion is disposed such that it tends to fall under its own weight to minimize the spacing thereof with respect to the associated portion of the fixed wall means unless otherwise constrained to move away from that portion.

18. A baler according to claim 17, wherein weight-compensation means are provided for the feeder duct first wall portion.

19. A baler according to claim 1 wherein the movable wall means of the feeder duct is movable by crop material being fed into the feeder duct.

* * * * *